US008423557B2

(12) United States Patent
Li et al.

(10) Patent No.: US 8,423,557 B2
(45) Date of Patent: Apr. 16, 2013

(54) COMPUTER METHOD AND SYSTEM FOR DETERMINING INDIVIDUAL PRIORITIES OF SHARED ACTIVITIES

(75) Inventors: Lida Li, Redmond, WA (US); Werner Geyer, Boston, MA (US); Michael Muller, Medford, MA (US); Elizabeth A. Brownholtz, Andover, MA (US); Casey Dugan, Everett, MA (US)

(73) Assignee: International Business Machines Corporation, Armonk, NY (US)

( * ) Notice: Subject to any disclaimer, the term of this patent is extended or adjusted under 35 U.S.C. 154(b) by 315 days.

(21) Appl. No.: 11/935,894

(22) Filed: Nov. 6, 2007

(65) Prior Publication Data

US 2009/0119293 A1 May 7, 2009

(51) Int. Cl.
*G06F 7/00* (2006.01)

(52) U.S. Cl.
USPC ............ 707/748; 707/723; 707/752; 707/754

(58) Field of Classification Search ........................ None
See application file for complete search history.

(56) References Cited

U.S. PATENT DOCUMENTS

| | | | |
|---|---|---|---|
| 6,553,369 B1 | 4/2003 | Guay et al. | |
| 6,671,811 B1 * | 12/2003 | Diep et al. | 726/23 |
| 6,681,247 B1 * | 1/2004 | Payton | 709/217 |
| 7,043,698 B2 * | 5/2006 | Newbold | 715/789 |
| 7,080,082 B2 | 7/2006 | Elder et al. | |
| 7,209,906 B2 | 4/2007 | Goodwin et al. | |
| 7,567,958 B1 * | 7/2009 | Alspector et al. | 1/1 |
| 7,577,644 B2 * | 8/2009 | Fontoura et al. | 707/3 |
| 2005/0028104 A1 * | 2/2005 | Apparao et al. | 715/738 |
| 2005/0108074 A1 | 5/2005 | Bloechl et al. | |
| 2005/0154694 A1 | 7/2005 | Muller | |
| 2005/0216434 A1 * | 9/2005 | Haveliwala et al. | 707/1 |
| 2005/0256844 A1 * | 11/2005 | Cristol | 707/2 |
| 2005/0289166 A1 * | 12/2005 | Stanley et al. | 707/100 |
| 2006/0036565 A1 * | 2/2006 | Bruecken | 707/1 |
| 2006/0173838 A1 * | 8/2006 | Garg et al. | 707/5 |
| 2006/0235841 A1 * | 10/2006 | Betz et al. | 707/5 |
| 2007/0016553 A1 * | 1/2007 | Dumais et al. | 707/2 |

(Continued)

OTHER PUBLICATIONS

Muller, M.J., Geyer, W., Brownholtz, B., Wilcox, E., and Millen, D.R. One-hundred days in an activity-centric collaboration environment based on shared objects,Apr. 2004, CHI '04, Proceedings of the SIGCHI conference on Human factors in computing systems. pp. 375-382.*

(Continued)

*Primary Examiner* — Mohammad S Rostami
(74) *Attorney, Agent, or Firm* — Hamilton, Brook, Smith & Reynolds, P.C.

(57) ABSTRACT

A computer-implemented method and apparatus determines individual user priorities of collections of resources. The system represents collections of shared resources as end-user activities. An engine retrieves the activity access history of the user and the activity records and generates a description of each activity and a priority score. The engine may include a data collection component and a training and ranking component. Based on the activity descriptions and priority scores, the system generates and outputs for display an activity list ordered by individual user priority

18 Claims, 11 Drawing Sheets

U.S. PATENT DOCUMENTS

2007/0239534 A1* 10/2007 Liu et al. .......................... 705/14
2007/0266026 A1* 11/2007 Aravamudan et al. ............ 707/7
2008/0133495 A1* 6/2008 Fischer ............................. 707/5
2008/0249966 A1* 10/2008 Luege Mateos ................ 706/11
2009/0055355 A1* 2/2009 Brunner et al. ................... 707/3

OTHER PUBLICATIONS

Wu, J., et al., "On Schedulability Bounds of Static Priority Schedulers," Proceedings of the 11th IEEE Real Time and Embedded Technology and Applications Symposium (RTAS 2005), pp. 1-12.

McDermott, et al., "Dynamic Program Priority in Multi-Tasking Systems," *IBM TDB*, 29(2): 2 pages, (1986).

Dumais, S., et al. Implicit Queries (IQ) for Contextualized Search [online]. [retrieved on Oct. 31, 2007]. Retrieved from the Internet <URL: http://research.microsoft.com/~sdumais/IQDemo-SIGIR2004-Final.pdf>.

Goodman, J. and Carvalho, V.R. Implicit Queries for Email [online]. [retrieved on Oct. 31, 2007]. Retrieved from the Internet <URL: http://www.cs.cmu.edu/~vitor/papers/ceas05.pdf>.

Horvitz, E., et al. Models of Attention in Computing and Communication: From Principles to Applications [online]. [retrieved on Oct. 31, 2007]. Retrieved from the Internet <URL: http://research.microsoft.com/~horvitz/cacm-attention.htm>.

Kanellos, M. Microsoft Aims for Search on, its own terms [online]. [retrieved on Oct. 31, 2007]. Retrieved from the Internet <URL: http://www.news.com/2102-1008_3-5110910.html>.

Sen, S., et al., "FeedMe: A Collaborative Alert Filtering System," *Conference '04*, University of Minnesota, IBM T.J. Watson Research, IBM Software Group (2004).

* cited by examiner

COMPUTER METHOD AND SYSTEM FOR DETERMINING INDIVIDUAL PRIORITIES OF SHARED ACTIVITIES

BACKGROUND OF THE INVENTION

Activity-centric collaboration (as implemented in Lotus Connections Activities Product or shared workspace products or the like) allows users to create activity structures that help them manage projects, organize tasks, share documents and collect related resources in a single activity representation. As the number of activities grows, it becomes more difficult to manage them and increases the effort to find those high-priority activities that are important and require ones attention. The most common approach to cope with this problem in existing products is to sort activities in a list view by the last update time of each activity, or optionally in an outline view.

The problem with this approach is that last update time does not always match the actual priority of this activity for a particular user. Moreover, for one user, the activity might have a high priority, for another user, the same activity might have a low priority. The current approaches do not take into account the individual differences in priorities.

SUMMARY OF THE INVENTION

The core idea of this disclosure is to monitor end-users' activity access and interaction behavior (i.e. not only reading behavior but also reading creating and editing resources in activities, thus reading access history) and generate an activity list sorted by individual priorities computed based on a learning model trained with the user's access history. This approach combines a set of preference features and creates a model according the user's past access to the activity.

In a preferred embodiment, computer method and apparatus determines individual priorities of shared activities. An engine obtains (by retrieving from a server, by monitoring, or the like) each end user's activities including access history of the user. The engine generates a description of each activity and a priority score. In particular, the engine is formed of (i) a data collector component which periodically retrieves both the access history of a user's activities and the activity records, and (ii) a training and ranking component which generates the activity descriptions with priority scores. In one embodiment, the training and ranking component further creates training data according to the retrieved activity data per user. The training data indicates relative priority between activities.

An output module is coupled to receive from the monitoring engine the activity descriptions and priority scores. In turn, the output module provides (generates or otherwise outputs) an activity list ordered by individual user priority.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Figure 1A:
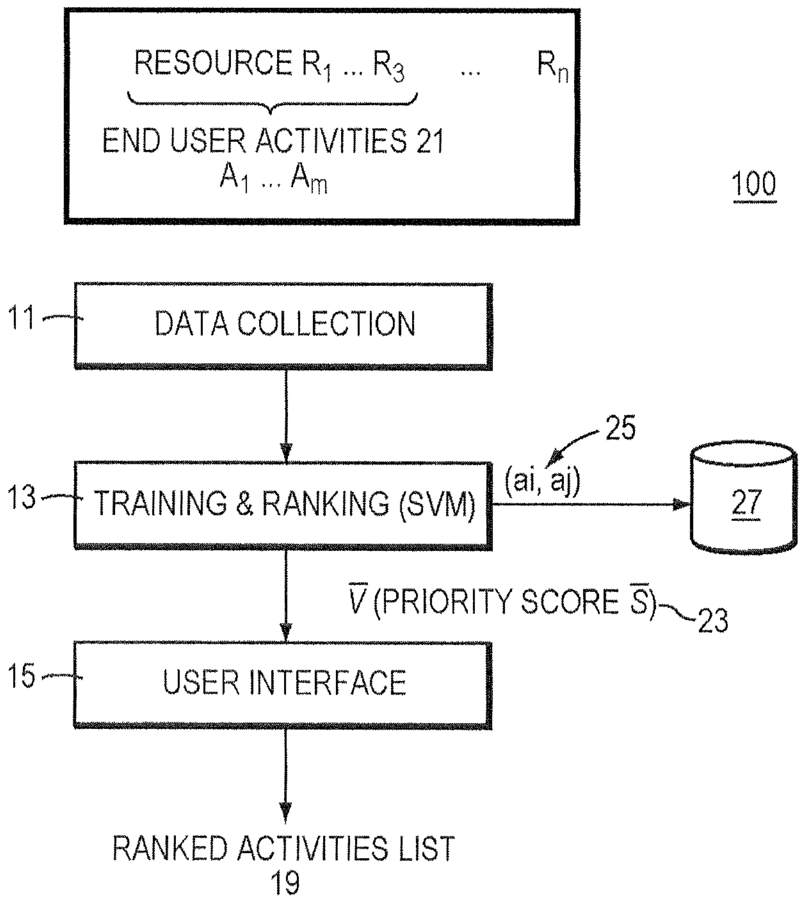
FIG. 1*a* is a schematic view of one embodiment of the present invention.

In FIG. 1*a* is illustrated one embodiment of the present invention. There a computer system 100 of the present invention for prioritizing end-user activities is formed of three components: a data collection component 11, a training and ranking component 13 and a user interface (UI) component 15. Each component 11, 13, 15 is particularized below. As used herein "End-User activities" 21 are collections of task-oriented resources $R_1 \ldots R_n$ which may contain various content types, e.g. documents, files, chats, emails, links, etc. So each activity contains resources. The present invention system 100 prioritizes for a user those activities $A_1 \ldots A_m$ 21 that the user is associated with and leverages various metrics derived from the structure and the membership of an activity (a collection of resources R), e.g. when the activity was last updated, when the user last accessed the activity, number of objects, creative score, connection strength between user and members etc.

The data collection component 11 retrieves or otherwise obtains the activity data (including the access history to the activity) 21 periodically. In a preferred embodiment, the activity data 21 could come from the Lotus Connections Activities server. In other embodiments, the activity data 21 could come from any individual activity store (including a Personal Information Manager or PIM, such as Notes, Outlook, or many other desktop or web products and services), or the activity data 21 could come from any shared task-management system, such as IBM Lotus Connections Activities, Activity Explorer, Lotus Quickr, Lotus Quickplace, MS Groove, MS Sharepoint, Adobe Note Tag (Project Kiwi), etc.

The activity data 21 of importance to the present invention includes number of objects contained in the activity (collection of resources), when the activity was last updated, when the user last accessed the activity, data needed for generating a creative score and connection strength between the user and members as will be made clear below. This data 21 also includes the detailed records for each resource in the activity such as name, description, tags, members and the access history of users.

The training and ranking component 13 generates a description of each activity with a priority score. In a preferred embodiment, the description takes the form of a feature vector $\overline{V}$ that describes each activity and the priority score $\overline{S}$ is calculated based on the generated vector as illustrated at 23 in FIGS. 1*a* and 1*b*. This component 13 also creates training data 25 according to the retrieved access history from the users. The training data 25 is created and stored (for example in a data store 27) as a set of pairwise activities (ai,aj). Each pair (ai,aj) implies activity ai has higher priority than activity aj. The training pairs are generated by checking the user's access history and by assuming for each day the activities the user accessed have higher priority than those that the user does not access. In a preferred embodiment, the calculation of score $\overline{S}$ is done by applying a Support Vector Machine (SVM) to the ranking problem. The basic ranking algorithm was described by Joachims (T. Joachims, *Optimizing Search Engines Using Clickthrough Data*, Proceedings of the ACM Conference on Knowledge Discovery and Data Mining (KDD), ACM, 2002, herein incorporated by reference, and is now applied to ranking. The UI module 15 visualizes the list of activities ordered by priority scores.

The present invention applies the general ranking algorithm to the problem of prioritizing activities (e.g., feature vectors $\overline{V}$ and corresponding priority scores $\overline{S}$ 23 in FIG. 1*a*). In order to rank activities, applicants use a set of selected features derived from the activity representation (feature vector $\overline{V}$) as input for the algorithm. In this approach, each activity is represented by 10 features for example. It is understood that other features can be used or included in the feature vectors. Each feature can be generated in two ways: (i) by SQL queries from or API calls to the local or remote database 27 and (ii) online in memory cache of activity statistics. For performance reasons, an in-memory cache can be created when the system 100 is started and updated online.

In one embodiment, the following features are used for prioritization:

User recency: minutes from the last update time of the current user,

Activity recency: minutes from the last update time of any user,

Activity update frequency: number of activity entries updated by the user in the last 3 days/n (number for members in the activity), User update frequency: Number of user entries updated by user in last 3 days/n (number of members in the activity), User's creative score: A real value score indicating the ratio of entries created by the current user in the activity.

Shared items within activity: If the last update entry in the activity was not updated by the current user, the score is computed as the number of shared entries that with a direct connection between the current user and the last update user, e.g. current user has responded to an existing resource from last update user by attaching a new resource the existing one.

Shared activities: A real value score indicating the strength of relationship between the current user and the last update user based on the number of activities these two users have in common.

Membership recency: A boolean variable indicating if the user has been added as a member to the activity within 24 hours.

Co-Accessed activities: A real value score indicating the strength of relationship between the current activity and other activities that have been accessed in the past on the same day. The strength is measured by the co-access of the current activity and those activities.

Tag recency: Every time when a user creates an activity, adds an entry or updates an entry he/she can add tags to describe the activity or entry. For each tag, a recency score based on the appearance of the tag is computed to indicate how important the tag is related to the user's current work. Then for each activity, the sum of the score of the tags appearing in the activity is computed and matched against the user's tags to indicate the current importance of the activity for the user.

Figure 1B:
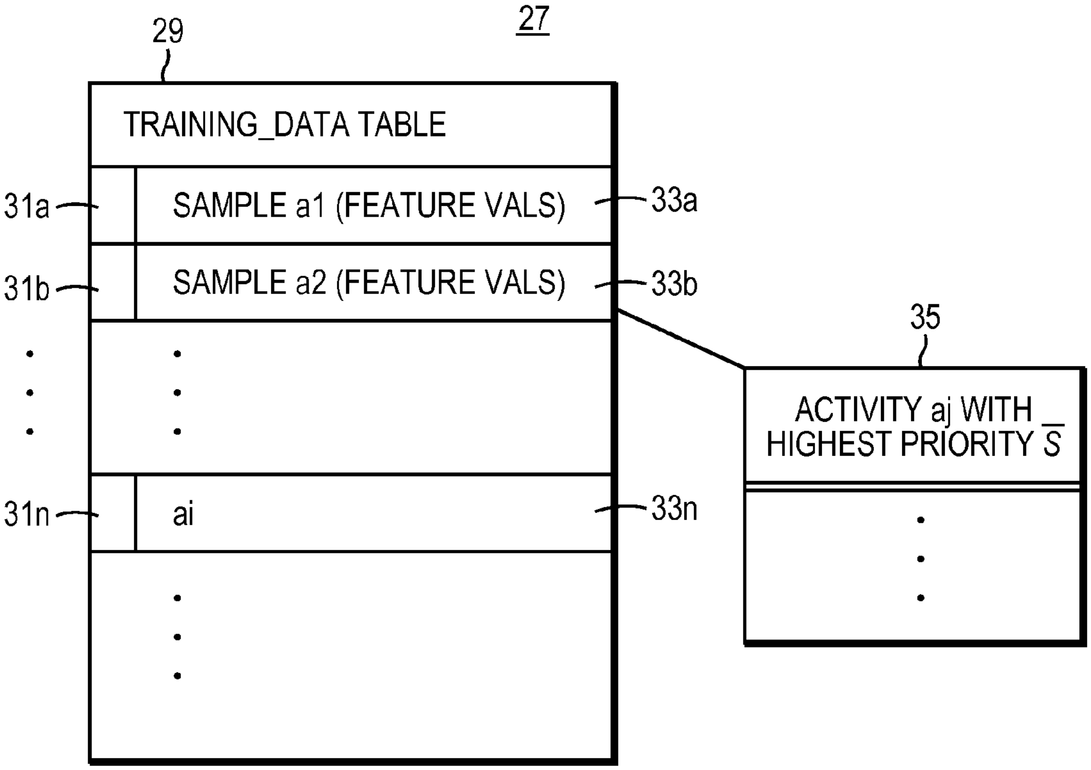
FIG. 1*b* is a block diagram of data store tables used in the embodiment of FIG. 1*a*.

In one embodiment as shown in FIG. 1*b*, the training data 25 is generated from the collected Lotus Connections Activities data and cached in a local database 27. A training_data table 29 stores the feature values of every training sample 33 where the activity_index 31 in the table represents the index of the training sample 33. A training_true table 35 stores the activity with highest priority (the one that the user is currently accessing) of each training sample 33. For each training sample (a1, a2 . . . an) where each ai=(f1 . . . fn), the true activity is aj, the input score vector $\overline{S}$=(r1 . . . rn) has the values rj set to 1 and the others set to 2. Every n minutes, the Ranking component 13 generates the current status of the activities $a=(a_1, a_2 \ldots a_n)$ where each $a_i=(f_1 \ldots f_n)$. Then the Ranking component 13 assigns a ranking score to each activity $a_i$. The result is stored in a local priority file at 23 (FIG. 1*a*) for example.

Figure 2B:
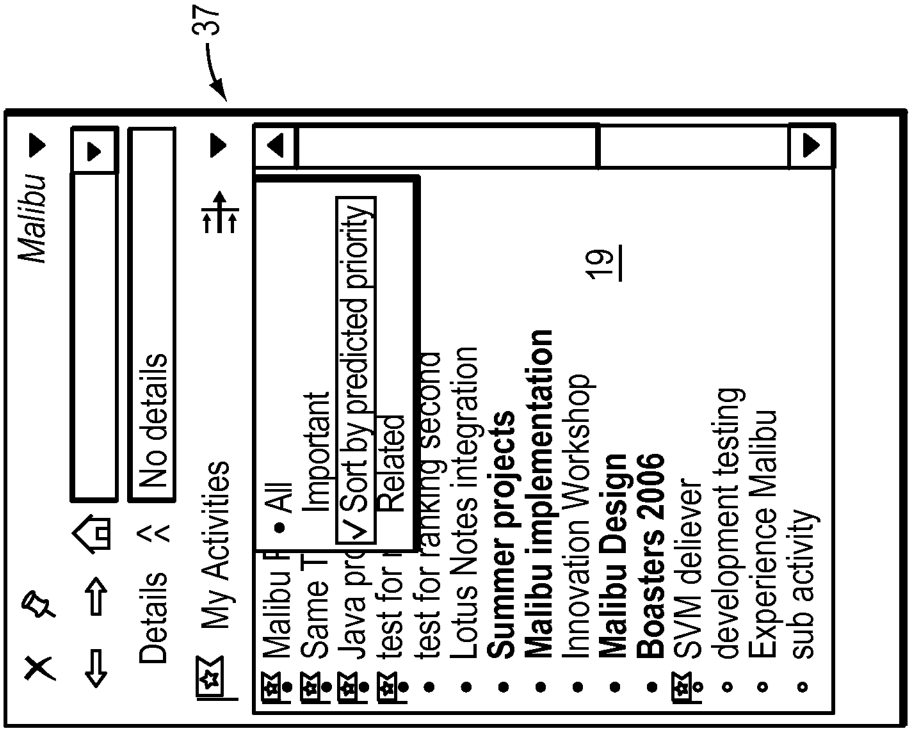
FIGS. 2*a* and 2*b* are illustrations of screen shots (views) of ranked activities lists in an embodiment of the present invention.
Figure 2A:
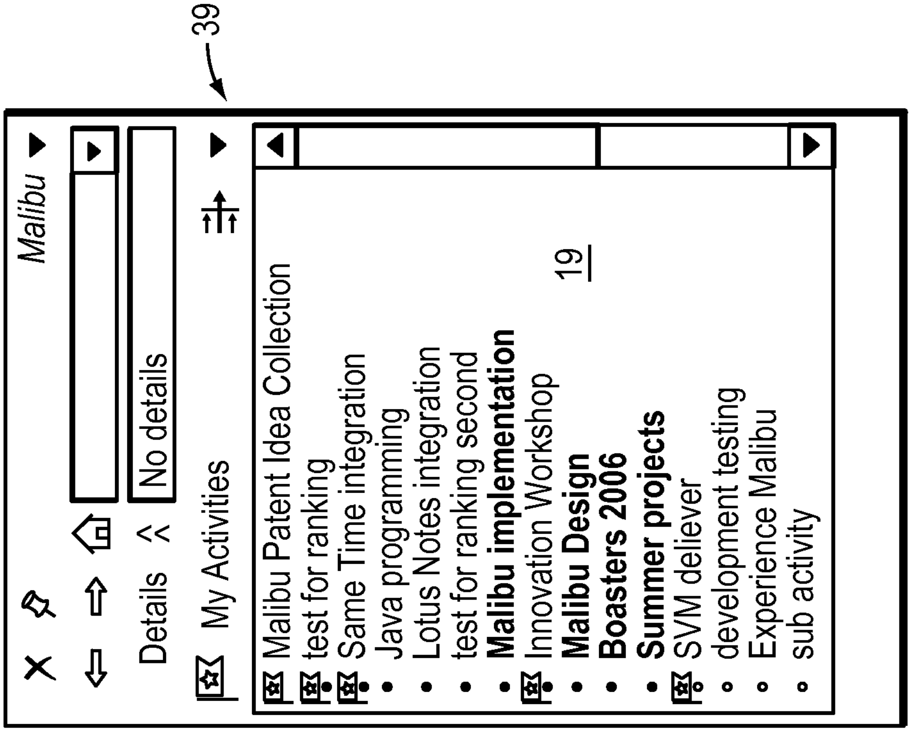

The UI component 15 can be shown in any application. Applicants implemented it in one embodiment as part of a desktop sidebar tool (M. J Muller, W. Geyer, B. Brownholtz, C. Dugan, D. R. Millen, and E. Wilcox. Tag-Based Metonymic Search in an Activity-Centric Aggregation Service. Proc ECSCW 2007, Limerick, Ireland, September 2007) as illustrated at 37, 39 in FIGS. 2*a* and 2*b*. The UI component 15 is periodically refreshed. In each refresh cycle, the UI component 15 reads the ranking/priority score $\overline{S}$ from the local priority file at 23. The ranking score is used to sort the activity list. The UI component 15 also marks activities that are among the top n activities with a special icon (for example, a flag as in FIGS. 2*a* and 2*b*), i.e. when the activity list is sorted by recency and NOT by ranking score, the user can easily see high priority activities. Also the user can change the default order of the activity list 19 to the priority order. The screen shots 37, 39 of FIGS. 2*a* and 2*b* show an example of a prioritized activity list 19 generated according to the principles of the present invention.

The following are further details on the preferred embodiment. The detailed formulas of several real value features are given below:

User's Creative Score:

The score is computed as $$S_{cr} = \sum_{i=1}^{k} o_i \Big/ \sum_{j=1}^{n} o_j$$

$o_i=\beta^{t-t_i}$ where t is the current time and $t_i$ the time when the object was created and $\beta\epsilon(0,1)$. $o_1, \ldots o_n$ are the exponential decay scores of all objects in the activity. $o_1, \ldots o_k$ are the subset for objects created by the user.

Shared Activities:

Given the set of shared activities $(a_1, a_2, \ldots, a_k)$ between the current user and the user who updated an activity most recently, and $m_i$ being the number of members of activity $a_i$, this value is computed as $$S_{so} = \sum_{i=1}^{k} \frac{1}{m_i}$$

Co-Accessed Activities:

Given the activities ($a_1, a_2, \ldots, a_k$) accessed on the current day, this score is computed as follows: where $d_i$ is the number of the days in the past the current activity and $a_i$ were both accessed on the same day.

$$S_{co} = \sum_{i=1}^{n} d_i$$

Tag Recency:

Given a tag score $$S_t = \sum_{i=1}^{n} \beta^{t-t_i}$$

where t is the current time and $t_i$ the time when the tag was added by the current user and a decay factor $\beta \in (0,1)$, this score is computed for each activity as the sum of the scores $S_t$ of the tags that appear in the activity.

Prior systems such as those that use the Lotus Discovery Server (Trademark owned by IBM) apply prioritization to documents only, whereas the present invention computes priorities for a collection of resources R. The LDS systems compute the priority of a document mainly based on access patterns of a single user whereas applicants disclosure incorporates various metrics concerning the structure and the membership of an activity (collection of resources).

Other system's in the art apply prioritization to tasks only where the present invention computes priorities for a collection of resources (called activities A) based on the properties of the activity. One such property applicants use to compute priority is access behavior associated with the activity, however applicants use many other properties as well.

Figure 4:
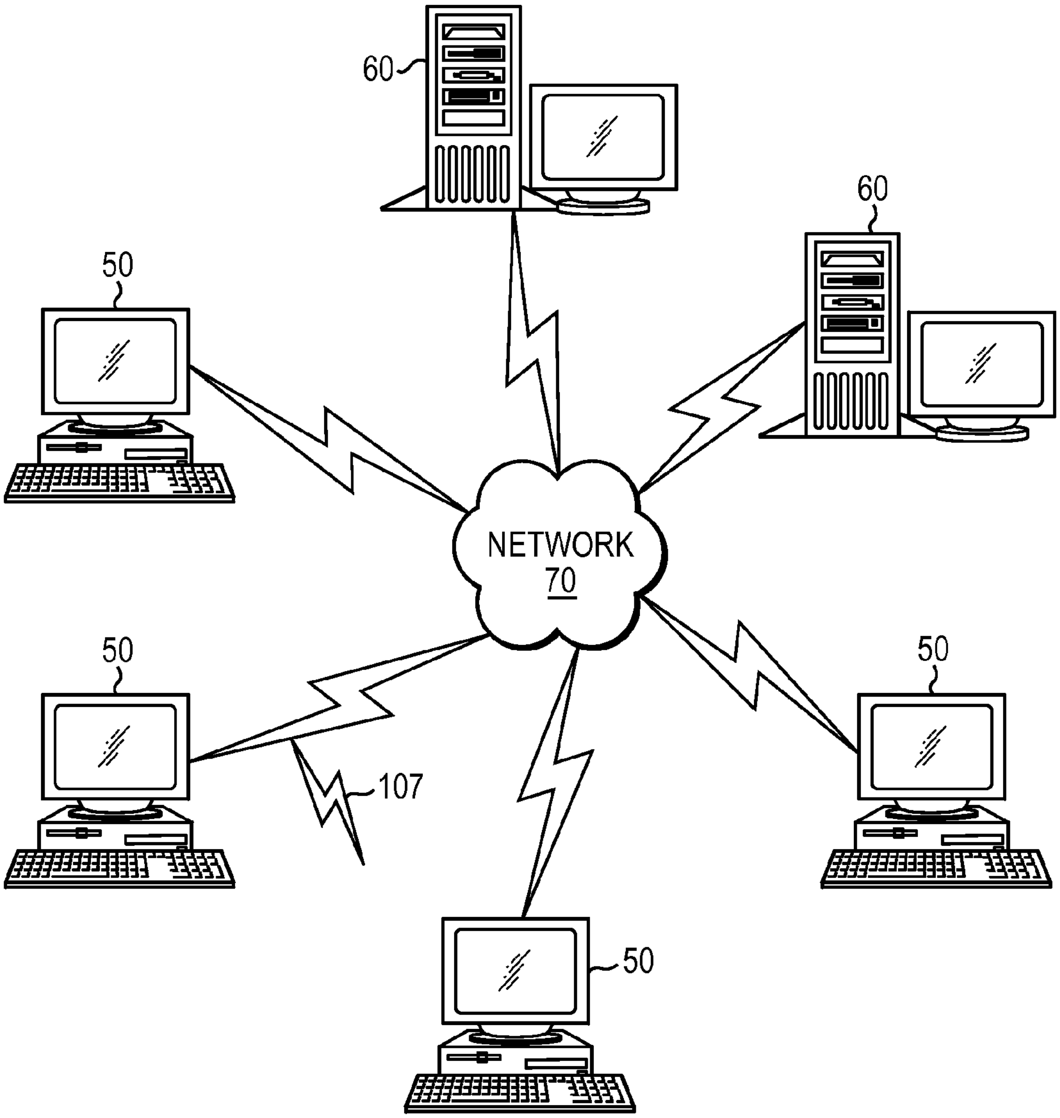
FIG. 4 is a schematic view of a computer network employing computer nodes of FIG. 3.
Figure 5:
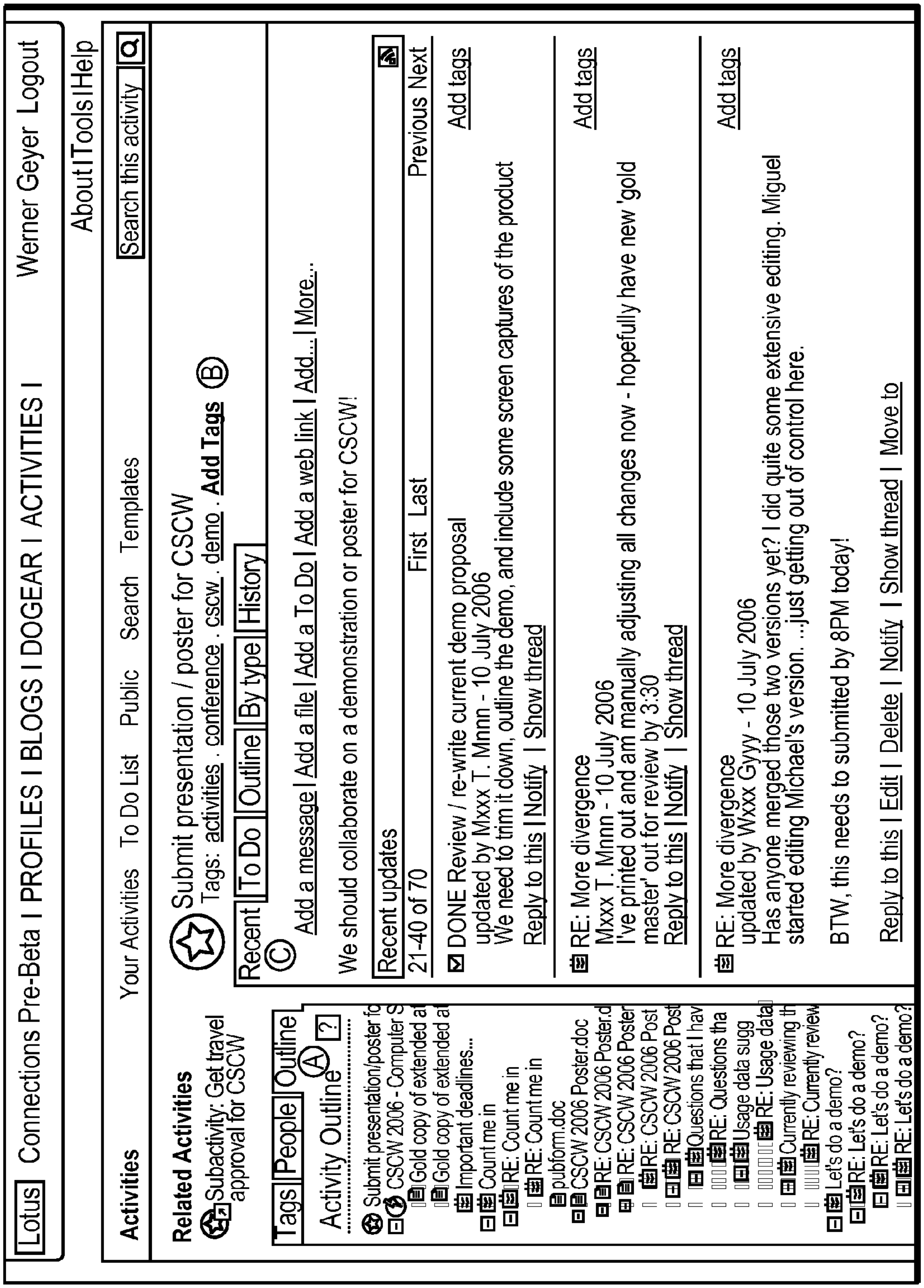
FIG. 5 is an illustration of an activity web page with activity outline on left discussed in the Appendix.
Figure 6:
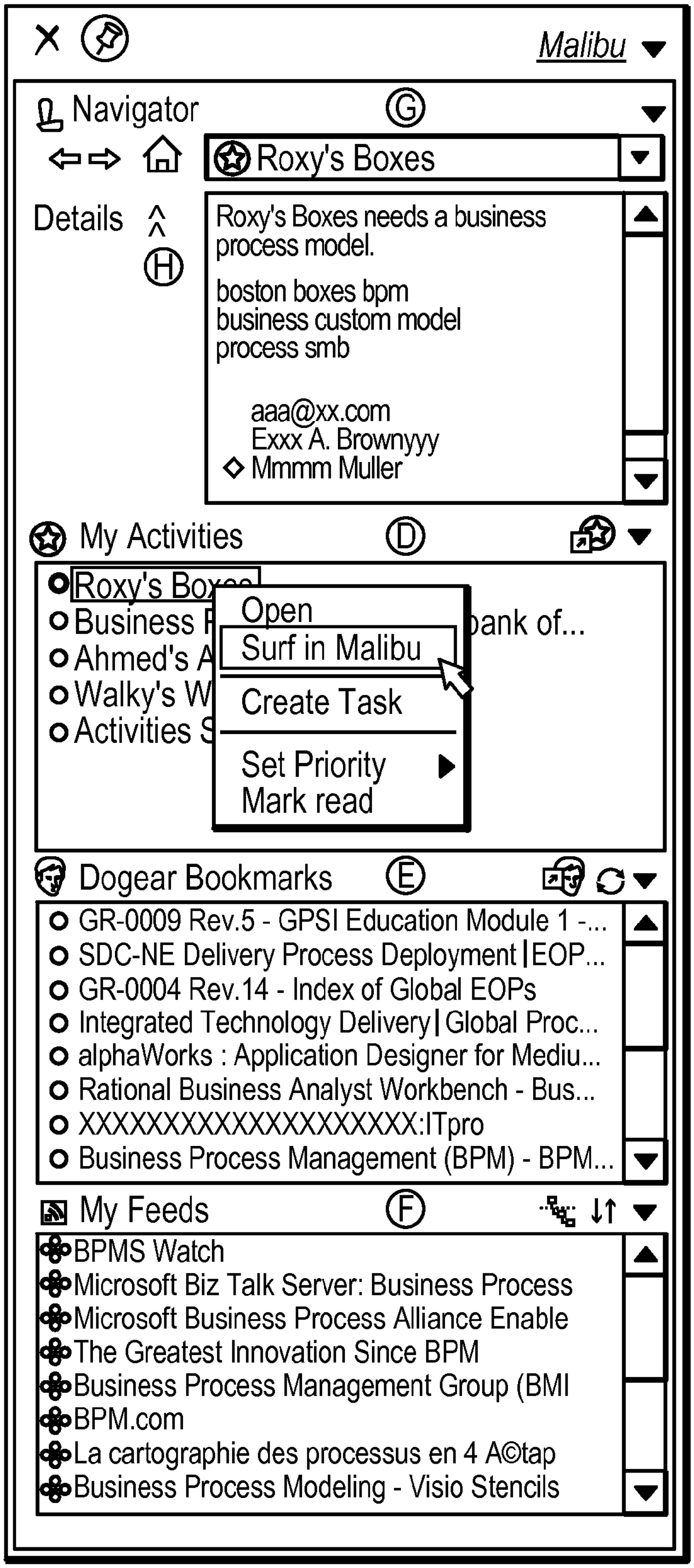
FIG. 6 illustrates a Malibu Side Bar discussed in the Appendix.
Figure 7:
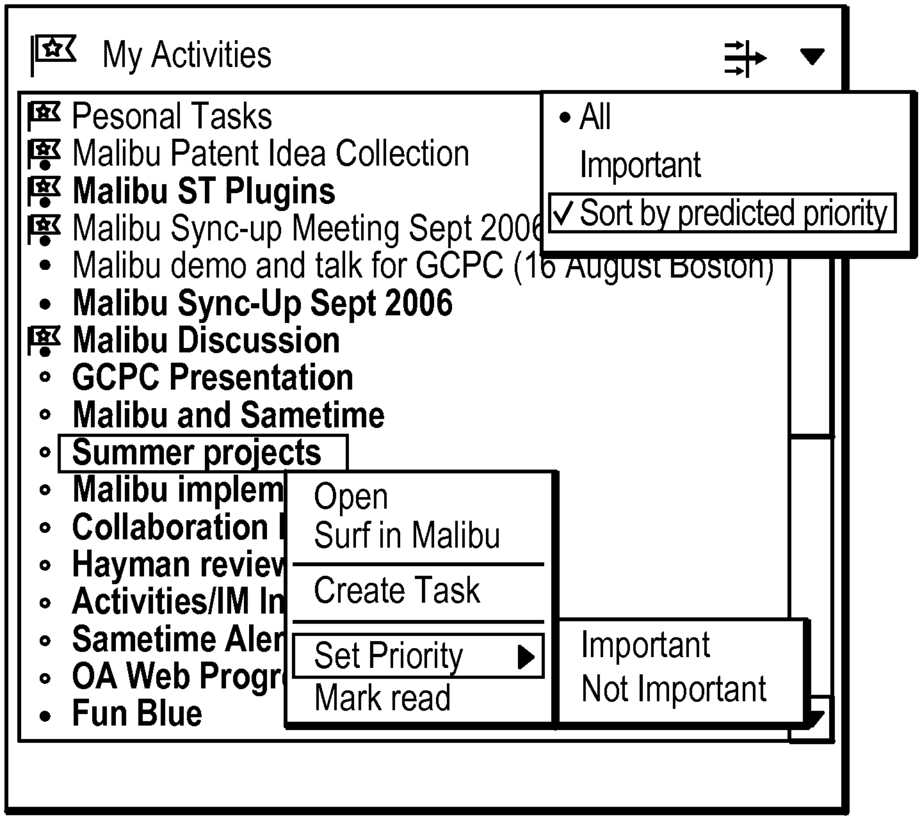
FIG. 7 is an activity view of Malibu integrated with the priority system. The color of the dot indicating the user set importance and the activities with a flag are the top five activities in the predicted priority list.
Figure 8:
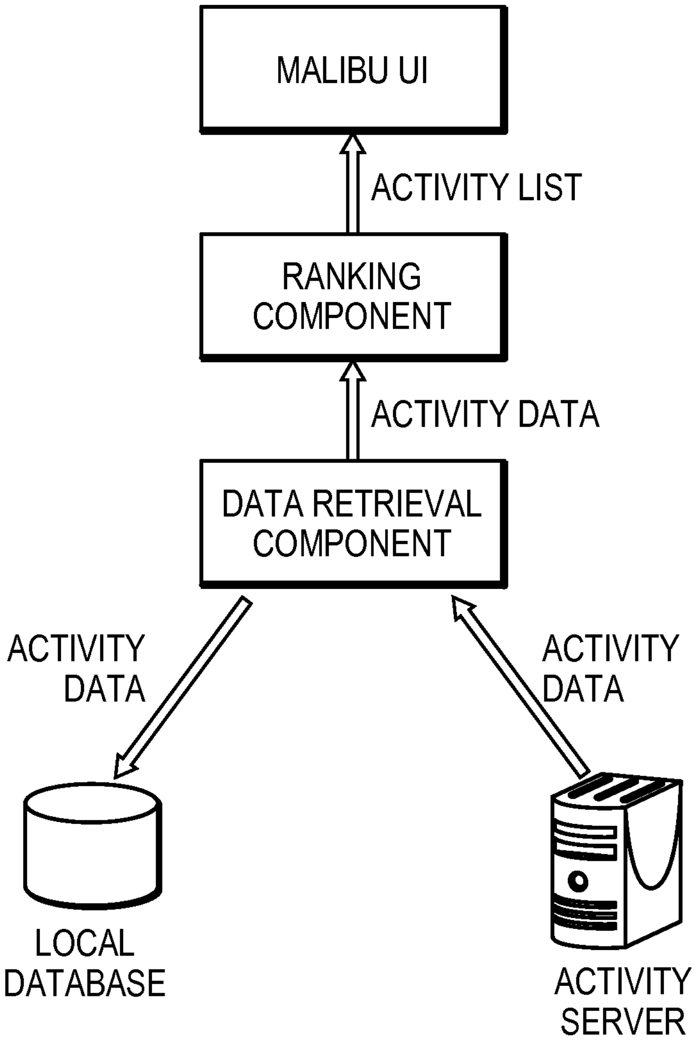
FIG. 8 illustrates the architecture of the activity ranking system in the Appendix.
Figure 9:
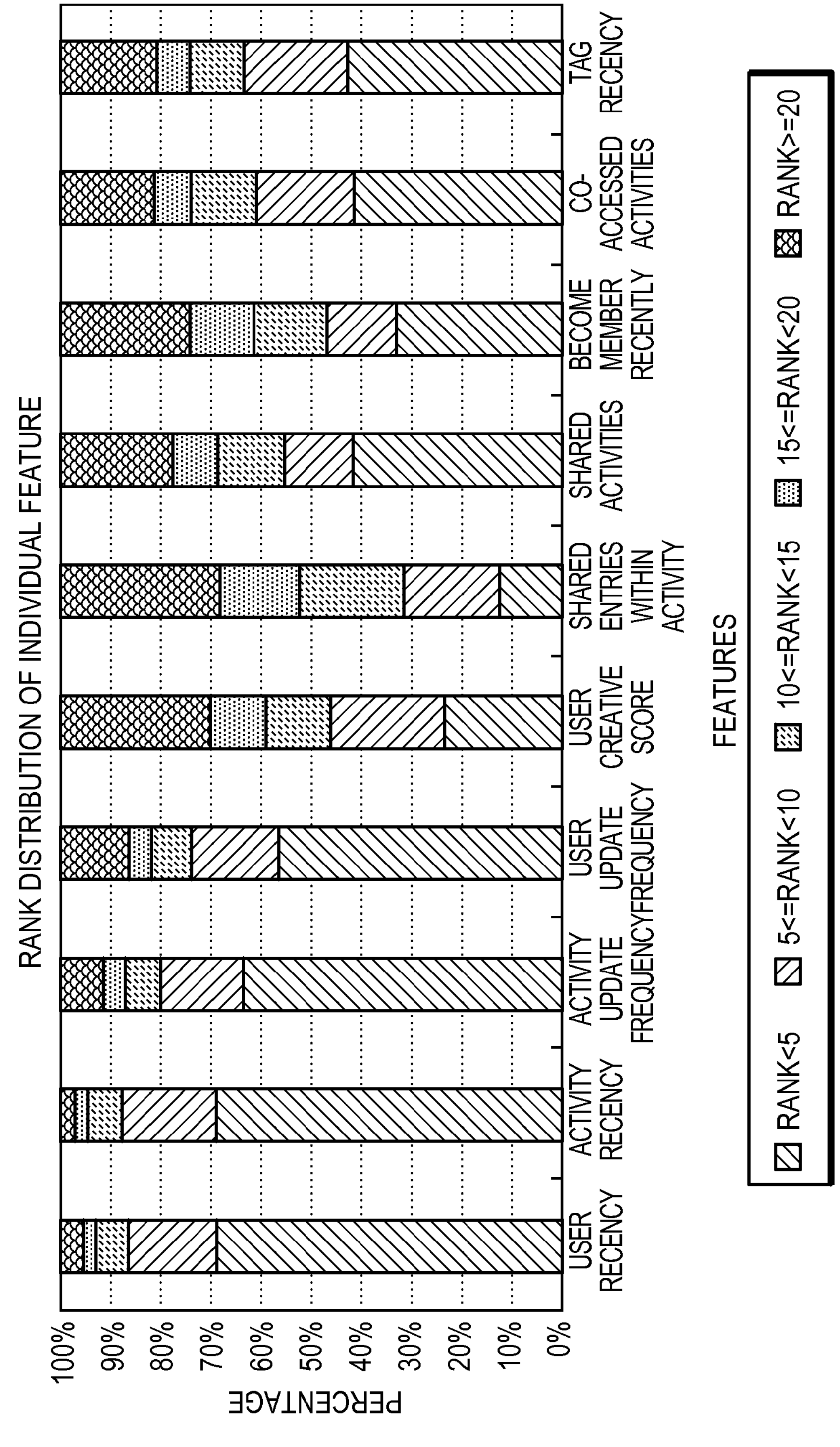
FIG. 9 illustrates rank distribution for individual feature computed with a data set containing 13 users with 62 activities per user on average (discussed in the Appendix).
Figure 10:
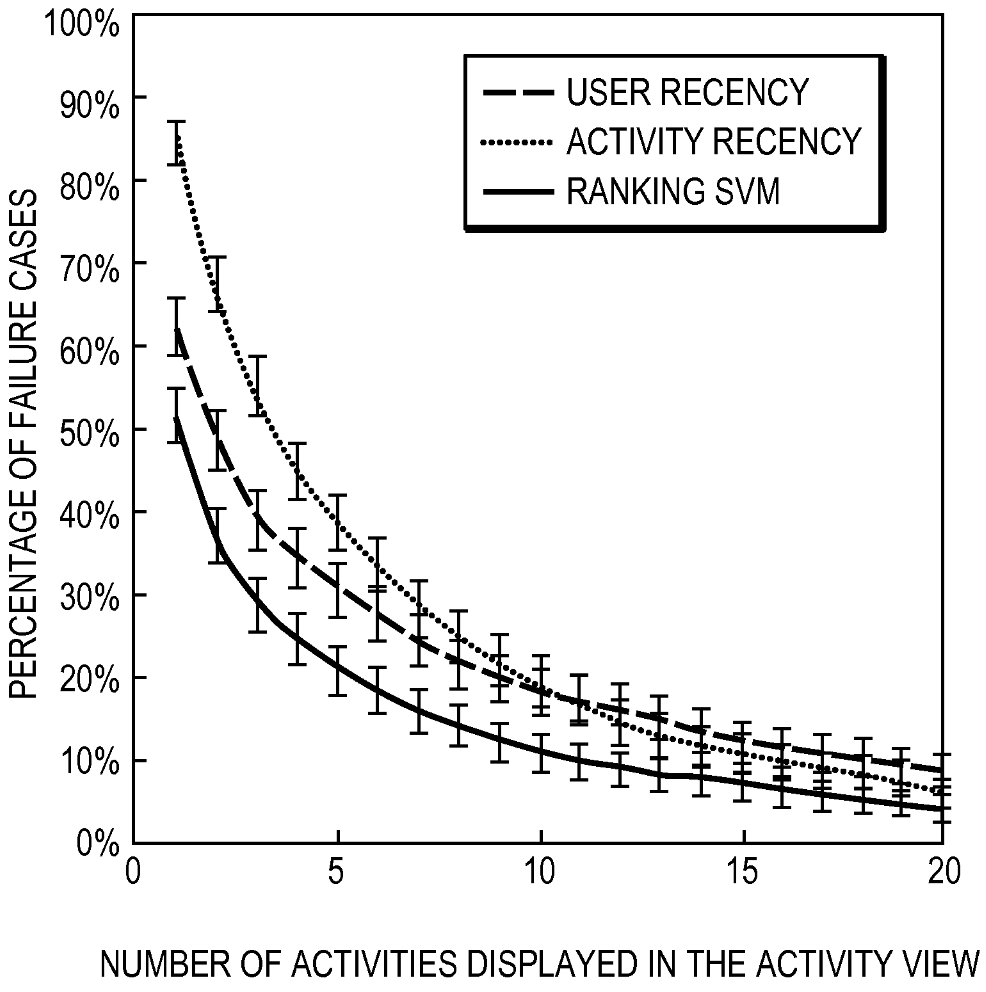
FIG. 10 illustrates distributions of Failure Cases for different size of activity view discussed in the Appendix.

FIG. 4 illustrates a computer network or similar digital processing environment in which the present invention may be implemented.

Client computer(s) 50 and server computer(s) 60 provide processing, storage, and input/output devices executing application programs and the like. Client computer(s) 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 3:
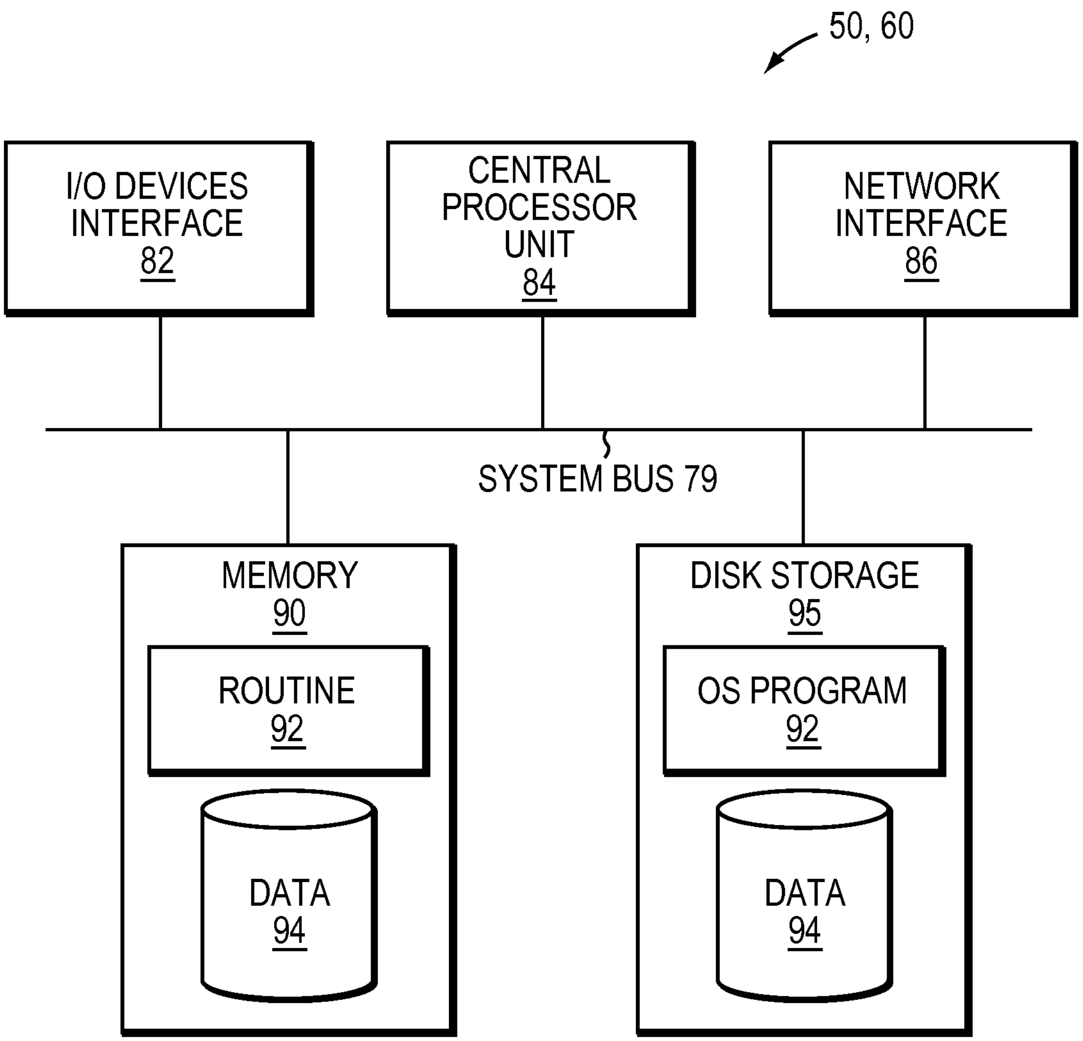
FIG. 3 is a block diagram of a computer node for implementing and executing embodiments of the present invention.

FIG. 3 is a diagram of the internal structure of a computer (e.g., client processor 50 or server computers 60) in the computer system of FIG. 4. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 4). Memory 90 provides volatile storage for computer software instructions 92 and data 94 used to implement an embodiment of the present invention (e.g., system 100, data collection component 11, training and ranking component 13, user interface 15 and system scores/process detailed above in FIGS. 1 and 2). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

While this invention has been particularly shown and described with references to preferred embodiments thereof, it will be understood by those skilled in the art that various changes in form and details may be made therein without departing from the scope of the invention encompassed by the appended claims.

For example, the present invention may be implemented in a variety of computer architectures. The computer network of FIGS. 3 and 4 are for purposes of illustration and not limitation of the present invention.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Further exemplification and details of other embodiments is found in the attached Appendix.

What is claimed is:

1. A Computer-based system for prioritizing activities based on users access, comprising:

an engine, including a processor, obtaining collections of resources as end user activities including, for each user, obtaining an activities access history of the user, the end-user activities including shared activities, a shared activity being an end-user activity having at least two end-users in common, the engine using respective feature vectors and generating a description of each shared activity with an individual user priority score taking into account differences in priorities among the at least two end-users of the shared activity, wherein each activity of the end-user activities of the obtained collections of resources contains resources and the engine records, for each said resource in the activity, access history of users, and wherein for a given shared activity, (i) the same feature vector is used to describe the shared activity and to calculate individual user priority score of the shared activity, and (ii) the respective obtained collection of resources providing a structure and membership of the given shared activity according to the individual user's last access to the shared activity, last update of the shared activity and connection strength between the individual user and other users associated with the shared activity; and an output module coupled to receive from the engine the shared activity descriptions and individual user priority scores, and outputs therefrom an activity list ordered by individual user priority, such that respective activity list of a user prioritizes collections of resources of that user, wherein the individual user priority scores are priorities for respective collections of resources of corresponding end-user activities and are based on properties of the corresponding end-user activities, the feature vectors enabling various metrics concerning the structure and membership of respective shared activity to be derived and utilized to calculate individual user priorities of the shared activity and thus respective collection of resources taking into account differences in priorities among the at least two end-users of the shared activity.

2. The Computer-based system as claimed in claim 1 wherein the obtained collections of resources of the end-user activities are collections of shared resources and wherein the properties of the end-user activities include access and interaction behavior.

3. The Computer-based system as claimed in claim 2 wherein the properties include any of:

number of objects contained in the activity, when the activity was last updated, frequency of activity update, when the user last accessed the activity, user update frequency, creative score, connection strength between the user and others, membership recency, co-accessed activities strength and tag recency.

4. The Computer-based system as claimed in claim 1 wherein the engine is formed of:

a data collection component periodically retrieving activity data; and a training and ranking component generating the activity descriptors with priority scores, the training and ranking component further creating training data according to the retrieved activity data per user, the training data indicating relative priority between activities.

5. A computer-implemented method for prioritizing shared resources, comprising:

representing collections of resources as end-user activities, the end-user activities including shared activities, a shared activity having at least two users in common, and for a given shared activity, the respective collection of resources providing a structure and membership of the given shared activity according to individual user's last access to the shared activity, last update of the shared activity and connection strength between the individual user and other users associated with the shared activity;

wherein each activity of the end-user activities of the represented collections of resources contains resources , for each said resource in the activity, recording access history of users;

obtaining said end-user activities, including for each user, monitoring access history of the user, the monitoring resulting in a description of each shared activity with an individual user priority score of the shared activity taking into account differences in priorities among the at least two end-users of the shared activity, the monitoring including using a same feature vector to describe the shared activity and to calculate a respective individual user priority score of the shared activity; and based on the shared activity descriptions and individual user priority scores in the feature vectors, generating and outputting for display an activity list ordered by individual user priority, such that respective activity list of a user prioritizes collections of resources of that user, wherein the individual user priority scores are priorities for respective collections of resources of corresponding end-user activities and are based on properties of the corresponding end-user activities, the feature vectors enabling various metrics concerning the structure and membership of respective shared activity to be derived and utilized to calculate individual user priorities of the shared activity and thus respective collection of resources taking into account differences in priorities among the at least two end-users of the shared activity.

6. A method as claimed in claim 5 wherein the properties of the end-user activities include access behavior.

7. A method as claimed in claim 6 wherein the properties include any of:

number of objects contained in the activity, when the activity was last updated, frequency of activity update, when the user last accessed the activity, user update frequency, creative score, connection strength between the user and others, membership recency, co-accessed activities strength and tag recency.

8. A method as claimed in claim 5 further comprising:

periodically retrieving activity data for the monitoring step; and creating training data according to the retrieved activity data per user, the training data indicating relative priority between activities.

9. A method as claimed in claim 5 further comprising:

for each activity forming a respective feature vector that describes the activity; and calculating the respective priority score based on the feature vector.

10. A computer system for prioritizing activities based on users access, comprising:

means for periodically retrieving end-user activity data including data of shared activities, by obtaining collections of task-oriented resources as end-user activities, a shared activity being an end-user activity having at least two end-users in common;

training and ranking means responsive to the retrieving means, the training and ranking means using respective feature vectors and generating a description of each shared activity with an individual user priority score taking into account differences in priorities among the at least two end-users of the shared activity, for a given shared activity, the same feature vector being used to describe the shared activity and to calculate individual user priority score of the shared activity, wherein each shared activity of the end-user activities of the obtained collections of task-oriented resources contains resources, and for each said resource in the shared activity, the retrieving means recording access history of users, and for each shared activity, the respective obtained collection of resources provide a structure and membership of the shared activity according to the individual user's last access to the shared activity, last update of the shared activity and connection strength between the individual user and other users associated with the shared activity; and output means coupled to the training and ranking means, based on the shared activity descriptions and individual user priority scores, the output means generating an activity list ordered by individual user priority such that a respective activity list of a user prioritizes collections of resources of that user, wherein the individual user priority scores are priorities for respective collections of resources of corresponding end-user activities and are based on properties of the corresponding end-user activities, the feature vectors enabling various metrics concerning the structure and membership of respective shared activity to be derived and utilized to calculate individual user priorities of the shared activity and thus respective collection of resources taking into account differences in priorities among the at least two end-users of the shared activity.

11. A computer system as claimed in claim 10 wherein the properties of the end-user activities include access behavior.

12. A computer system as claimed in claim 11 wherein the properties include any of:

number of objects contained in the activity, when the activity was last updated, frequency of activity update, when the user last accessed the activity, user update frequency, creative score, connection strength between the user and others, membership recency, co-accessed activities strength and tag recency.

13. A computer system as claimed in claim 10 wherein the training and ranking means further create training data according to the retrieved activity data, the training data indicating relative priority between activities.

14. A computer system as claimed in claim 10 wherein the training and ranking means further form the respective feature vectors that describe each activity; and each priority score being calculatable from the respective formed feature vector.

15. A computer program product comprising a computer useable, nontransitory, storage medium having a computer readable program, the computer readable program when executed by a computer causes:

collections of one or more resources to be represented as end-user activities, the end-user activities including shared activities having two or more users in common, and for a given shared activity, the respective collection of resources providing a structure and membership of the given shared activity according to individual user's last access to the shared activity, last update of the shared activity and connection strength between the individual user and other users associated with the shared activity;

obtaining of said collections of resources as end-user activities, including for each user, obtaining access history of the user, the obtaining resulting in a description of each shared activity with individual user priority score taking into account differences in priorities among the two or more users of the shared activity, wherein each shared activity of the end-user activities of the obtained collections of resources contains resources, and for each said resource in the shared activity, recording access history of users; and an activity list ordered by individual user priority to be generated based on the shared activity descriptions and individual user priority scores, such that a respective activity list of a user prioritizes collections of resources of that user, wherein, for each shared activity, the resulting description of the shared activity is in the form of a feature vector that both describes the shared activity and is used to calculate the individual user priority score, wherein the individual user priority scores are priorities for respective collections of resources of corresponding end-user activities and are based on properties of the corresponding end-user activities, the feature vectors enabling various metrics concerning the structure and membership of respective shared activity to be derived and utilized to calculate individual user priorities of the shared activity and thus respective collection of resources taking into account differences in priorities among the two or more users of the shared activity.

16. A computer program product as claimed in claim 15 wherein the properties of the end-user activity include access behavior.

17. A computer program product as claimed in claim 16 wherein the properties include any of:

number of objects contained in the activity, when the activity was last updated, frequency of activities update, when the user last accessed the activity, user update frequency, creative score, connection strength between the user and others, membership recency, co-accessed activities strength and tag recency.

18. A computer program product as claimed in claim 15 wherein the computer readable program further comprises program code which when executed by a computer causes:

activity data to be periodically retrieved; and training data to be created according to the retrieved activity data, the training data indicating relative priority between activities.

* * * * *